United States Patent
Vistisen et al.

(10) Patent No.: US 12,485,196 B2
(45) Date of Patent: Dec. 2, 2025

(54) SYSTEMS AND METHODS OF AUTONOMOUS MOBILE DISINFECTION WITH MINIMAL INPUT

(71) Applicant: Blue Ocean Robotics ApS, Odense (DK)

(72) Inventors: Rasmus Vistisen, Odense (DK); John Erland Østergaard, Odense (DK); Efraim Vitzrabin, Odense (DK)

(73) Assignee: Blue Ocean Robotics ApS, Odense (DK)

( * ) Notice: Subject to any disclaimer, the term of this patent is extended or adjusted under 35 U.S.C. 154(b) by 636 days.

(21) Appl. No.: 17/847,441

(22) Filed: Jun. 23, 2022

(65) Prior Publication Data

US 2023/0414813 A1    Dec. 28, 2023

(51) Int. Cl.
    *A61L 2/10*     (2006.01)
    *A61L 2/24*     (2006.01)
    *G05D 1/00*     (2024.01)

(52) U.S. Cl.
    CPC    *A61L 2/24* (2013.01); *A61L 2/10* (2013.01); *G05D 1/0094* (2013.01); *G05D 1/0219* (2013.01); *G05D 1/0274* (2013.01); *A61L 2202/14* (2013.01); *A61L 2202/16* (2013.01)

(58) Field of Classification Search
    CPC .................................... A61L 2/24; A61L 2/10
    See application file for complete search history.

(56) References Cited

U.S. PATENT DOCUMENTS

| | | |
|---|---|---|
| 2021/0346558 A1 | 11/2021 | Pan |
| 2022/0118133 A1 | 4/2022 | Rephaeli |
| 2022/0143250 A1* | 5/2022 | Pierson .................. G05D 1/689 |

FOREIGN PATENT DOCUMENTS

WO    2021202514 A2    10/2021

OTHER PUBLICATIONS

Partial European Search Report issued in App. No. EP22183171, dated Apr. 18, 2023, 26 pages.
Extended European Search Report issued in App. No. EP22183171, dated Aug. 3, 2023, 24 pages.

* cited by examiner

*Primary Examiner* — Kevin Joyner
(74) *Attorney, Agent, or Firm* — Kevin T. Roddy; BUTZEL LONG

(57) ABSTRACT

Implementations of the disclosed subject matter provide a method of mobile disinfection that includes positioning a mobile robot in an area to be disinfected and receiving a command to perform disinfection at the mobile robot. The processor may determine whether the area is cleared for disinfection based on one or more signals outputted from the one or more sensors of the mobile robot when it is determined that the area is already mapped. A light source of the mobile robot may emit ultraviolet (UV). The processor may generate a two dimensional (2D) map or a three dimensional (3D) map based on at least one of the surface and the object that are detected by a sensor as the mobile robot moves, and an exposure map of at least one of the air, the surface, and/or the object exposed by the emitted UV light in the area to be disinfected and dosage levels of the emitted UV light applied as the mobile robot moves.

17 Claims, 14 Drawing Sheets

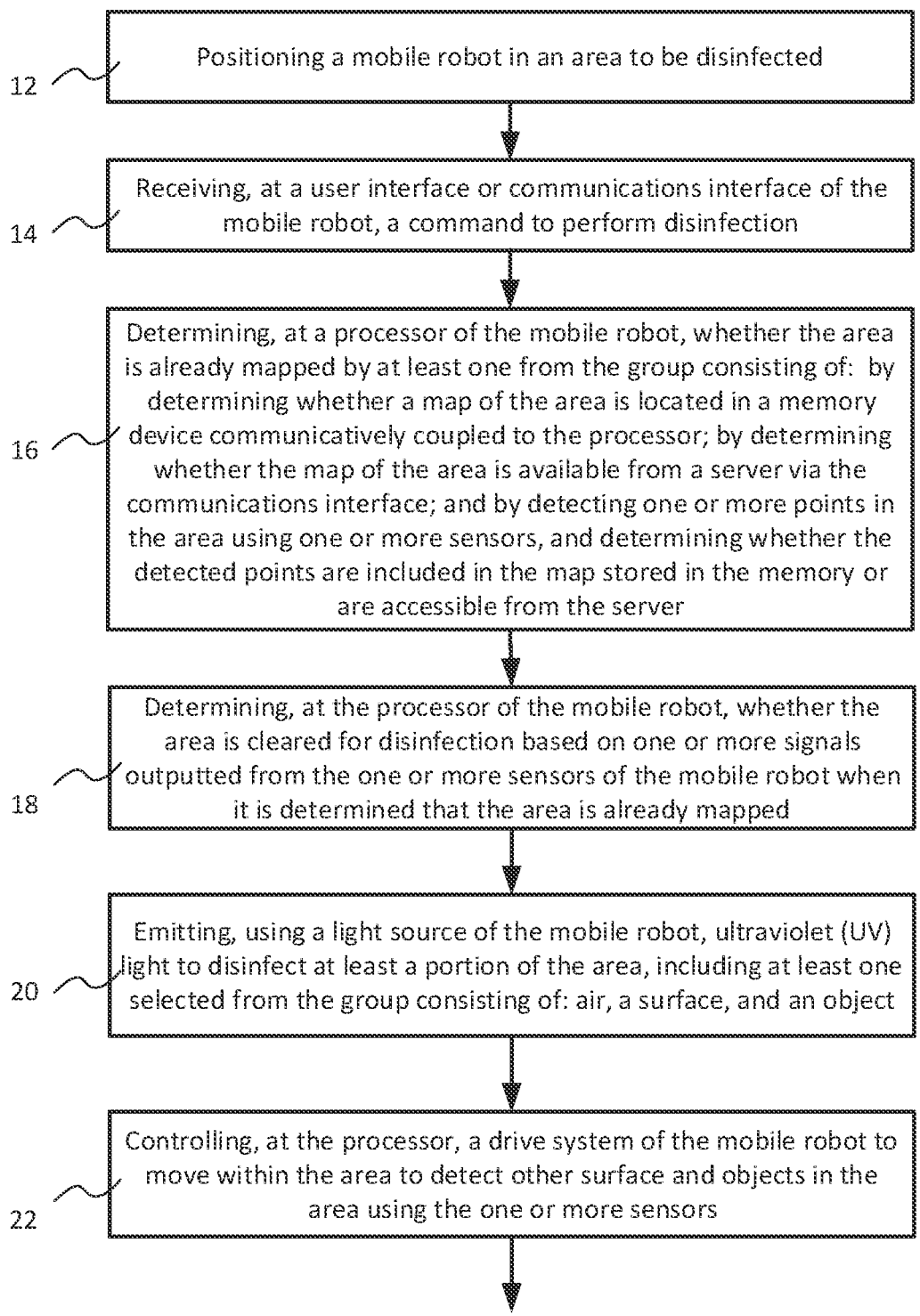

32 — Determining, using the processor and at least one output signal from the one or more sensors, disinfection positions for the mobile robot to output the UV light to disinfect at least one of the air, the surface, and the object in the area based on the received command.

34 — Adjusting, at the processor, a speed of movement of the drive system of the mobile robot and a duration time for outputting the UV light to one or more of the disinfection positions based on at least one of the group consisting of: the one or more pathogens or microorganisms to be targeted; and the LOG level of the received command

36 — Stopping, at the processor, the output of UV light from the light source, when UV light has been output to the area based on the generated exposure map

SYSTEMS AND METHODS OF AUTONOMOUS MOBILE DISINFECTION WITH MINIMAL INPUT

BACKGROUND

Mobile devices, such as mobile robots, can be operated to disinfect indoor areas, such as a room that has contaminated surfaces. Typically, such devices do not disinfect an area in an efficient manner and may fail to disinfect all contaminated surfaces. Moreover, such devices typically require supervision from an operator, who periodically provides such mobile robots with instructions to perform a disinfection operation.

BRIEF SUMMARY

According to an implementation of the disclosed subject matter, a method may be provided that includes positioning a mobile robot in an area to be disinfected, and receiving, at a user interface or communications interface of the mobile robot, a command to perform disinfection. The method may include determining, at a processor of the mobile robot, whether the area is already mapped by determining whether a map of the area is located in a memory device communicatively coupled to the processor, by determining whether the map of the area is available from a server via the communications interface; and/or by detecting one or more points in the area using one or more sensors, and determining whether the detected points are included in the map stored in the memory or accessible available from the server. The method may include determining, at the processor of the mobile robot, whether the area is cleared for disinfection based on one or more signals outputted from the one or more sensors of the mobile robot when it is determined that the area is already mapped. Using a light source of the mobile robot, ultraviolet (UV) light may be emitted to disinfect at least a portion of the area, including at least one of air, a surface, and/or an object. The processor of the mobile robot may control a drive system of the mobile robot to move within the area to detect other surfaces and objects in the area using the one or more sensors. The method may include generating, at the processor of the mobile robot, a two dimensional (2D) map or a three dimensional (3D) map based on the detected at least one of the surface and the object as the mobile robot moves, and an exposure map of at least one of the air, the surface, and the object exposed by the emitted UV light in the area to be disinfected and dosage levels of the emitted UV light applied as the mobile robot moves. The memory communicatively coupled to the processor may store a trajectory of the mobile robot moving within the area, the generated map, and the generated exposure map. The method may include outputting, via the user interface or the communications interface, a disinfection report based on the generated exposure map.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIGS. 1A-6 show an example method of performing disinfection with a mobile robot in an area with minimal input according to implementations of the disclosed subject matter.

DETAILED DESCRIPTION

Figure 1B:
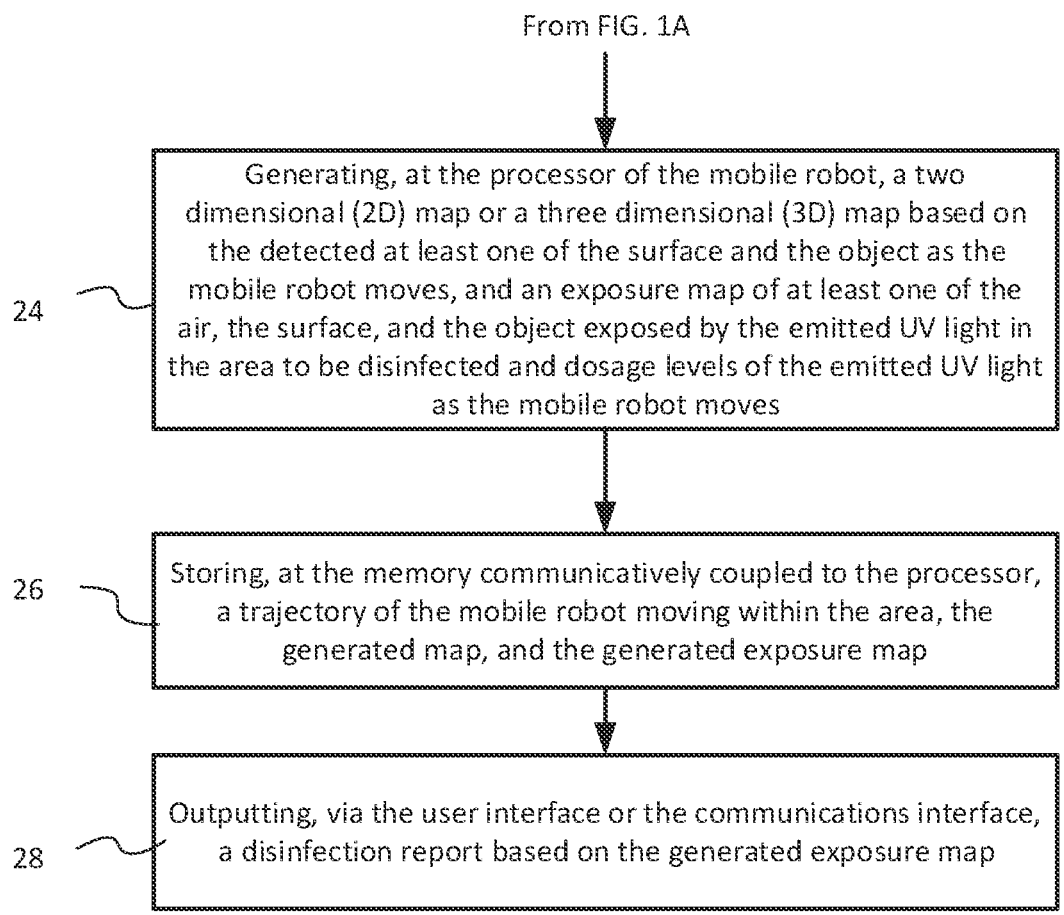

In implementations of the disclosed subject matter, an operator of a mobile robot for disinfection may select a single command on a user interface of the mobile robot, or a device of the operator may transmit the single command to the communications interface of the mobile robot. The mobile robot may perform disinfection of an area based on the single selection and/or transmitted single command. The area to be disinfected may be an area that has already been mapped or may be an unmapped area.

When the command is received, the mobile robot may autonomously perform disinfection operations in the area. As part of the disinfection operation, the mobile robot may explore the area, and determine disinfection positions autonomously. The mobile robot may determine a route within the area to disinfect the area. In some implementations, the determined route may be based on the determined disinfection positions.

The mobile robot may map the area as it moves by detecting objects, surfaces, and the like. The mobile robot may map the disinfection positions on the map, and/or the dosage level of ultraviolet (UV) light that may be applied by ultraviolet light from a light source disposed on the mobile robot.

The mobile robot may finish the disinfection of the area when the mapping and disinfection of the area has been completed. The mobile robot may generate and output a disinfection report that may indicate the areas that have been disinfected, and the dosage level applied to one or more portions of the area.

In some implementations of the disclosed subject matter, an operator may select a single command for the mobile robot to perform a disinfection, where the single command may include one or more types of pathogens and/or microorganisms to be targeted by the mobile robot for disinfection, and/or a LOG level that defines a dose of the UV light. The LOG level may be a log reduction (i.e., logarithmic reduction), which may be a predictable percentage that a given pathogen will be inactivated by a disinfection method. For example, a 1 log reduction may reduce a pathogen and/or microorganism of interest by 90%. In another example, a 2 log reduction may provide a 99% reduction, a 3 log reduction may provide a 99.9% reduction, and the like.

The mobile robot may adjust the speed of the drive system of the mobile robot and/or time of exposure of UV light onto surfaces of the area to disinfect the pathogens and/or microorganisms to be targeted, and/or the LOG level. The mobile robot may map the disinfection positions and the dosage level of ultraviolet (UV) light to form an exposure map. For example, the exposure map may be a map which shows the portions and/or coverage of an area that has been exposed to UV light by the mobile robot. The exposure map may be generated based on a room and/or area layout, and/or the disinfection performed by the emission of UV light in the area by the mobile robot.

The mobile robot may finish the disinfection of the area when the mapping and disinfection of the area has been completed. The mobile robot may generate and output a disinfection report that may indicate the areas that have been disinfected, and the dosage level applied to one or more portions of the area. The disinfection report may include the exposure map and/or may be based at least in part on the exposure map.

FIGS. 1A-6 show an example method 10 of performing disinfection with a mobile robot in an area with minimal input according to implementations of the disclosed subject matter. At operation 12 shown in FIG. 1A, a mobile robot may be positioned in an area to be disinfected. The mobile robot may be mobile robot 100 shown in FIGS. 7-9 and described below. The mobile robot may be placed in a room (e.g., room 210 shown in FIG. 10), a building, an area outside, or the like.

At operation 14, a user interface (e.g., user interface 110 shown in FIG. 12) or communications interface (e.g., network interface 116 shown in FIG. 12) of the mobile robot may receive a command to perform disinfection. In some implementations, a single item and/or button of the user interface may be selected by a user, and the mobile robot may perform disinfection of at least the area that the mobile robot has been placed in. In some implementations, the communications interface of the mobile robot device may receive a single command to perform disinfection of at least the area that the mobile robot has been placed in. In some implementations, the received command to perform disinfection may include one or more pathogens and/or microorganisms to be targeted by the mobile robot for disinfection, and/or a LOG level that defines a dose of the UV light. In some implementations, the received command at a user interface or communications interface of the mobile robot may be a single instruction to perform all operations for disinfection of the area without receiving additional commands. For example, the single instruction may initiate and/or perform the operations shown in FIGS. 1A-1B. In some implementations, the single instruction may initiate and/or perform operations shown in FIG. 1A-1B, as well as at least one of the operations shown in FIGS. 2-6.

At operation 16, a processor (e.g., controller 114 shown in FIG. 12) of the mobile robot may determine whether the area is already mapped. For example, the processor may determine whether a map of the area is located in a memory device (e.g., memory 118 and/or fixed storage 120 shown in FIG. 12) communicatively coupled to the processor (e.g., controller 114 shown in FIG. 12). In another example, the processor may determine whether the map of the area is available from a server (e.g., server 140 and/or database 150 shown in FIG. 13) via the communications interface (e.g., network interface 116 shown in FIG. 12). In another example, the processor may detect one or more points in the area using one or more sensors (e.g., sensors 102, 102a, and/or 102b), and determine whether the detected points are included in the map stored in the memory (e.g., memory 118 and/or fixed storage 120) and/or is accessible from the server (e.g., server 140 and/or database 150).

Figure 7:
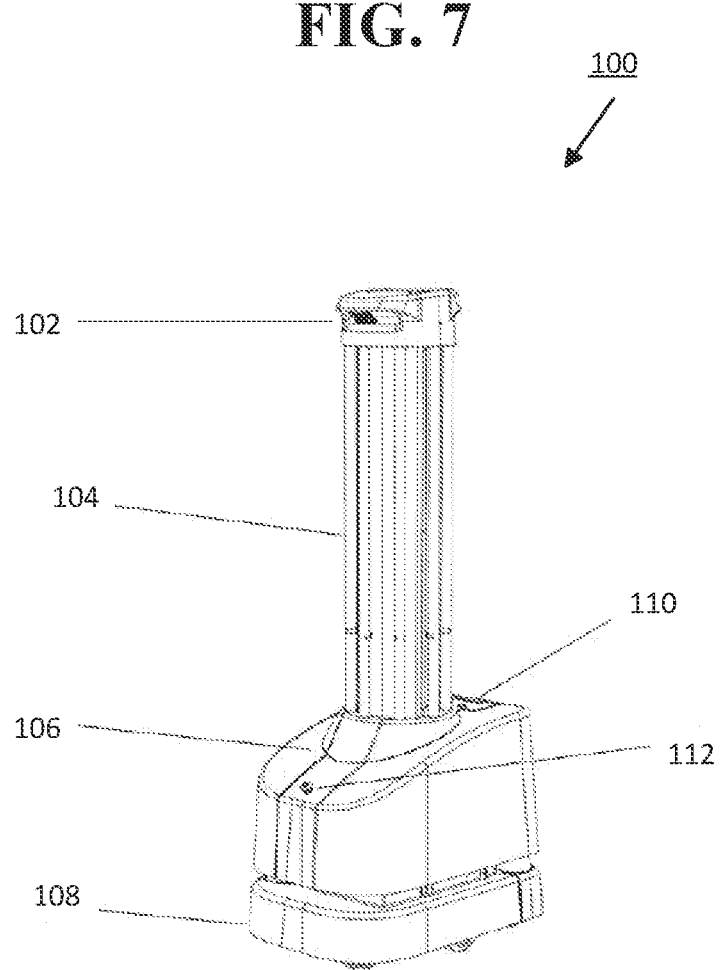
FIGS. 7-9 show a plurality of external views of the mobile robot having sensors to detect surfaces and objects in an area, and a light source to output UV light according to implementations of the disclosed subject matter.
Figure 8:
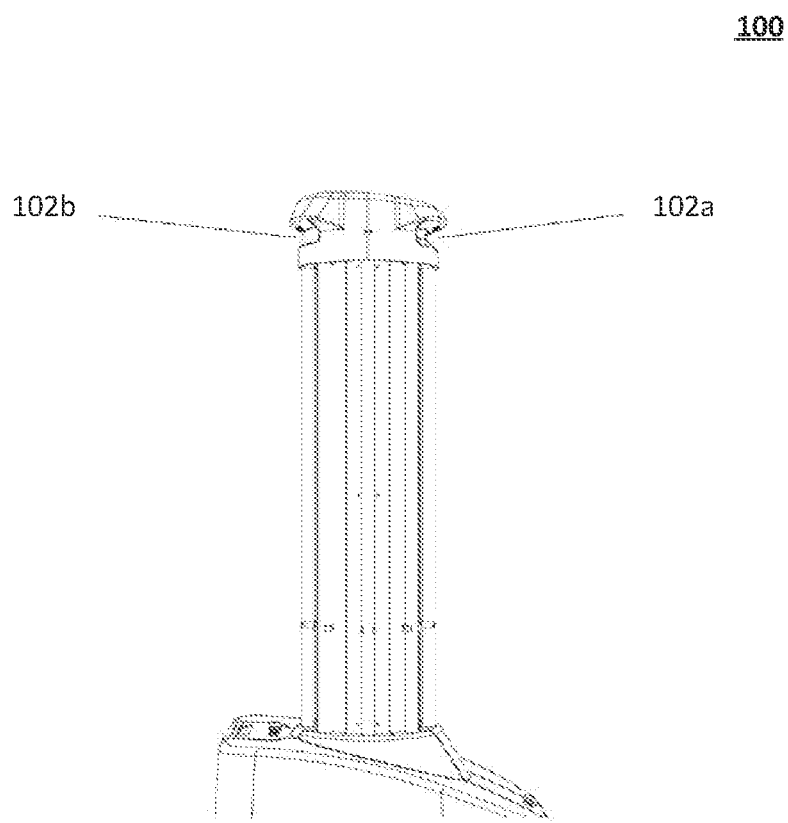
Figure 9:
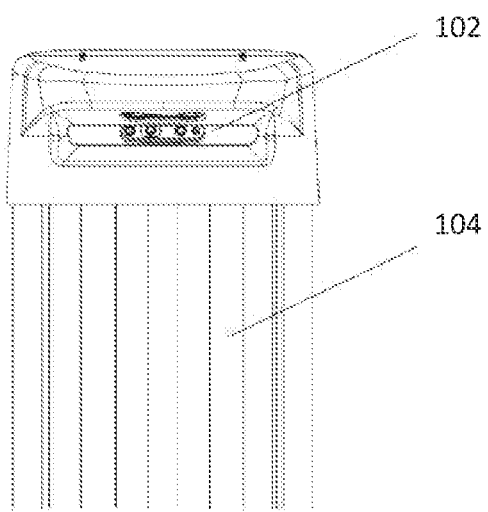

At operation 18, the processor of the mobile robot may determine whether the area is cleared for disinfection based on one or more signals outputted from the one or more sensors (e.g., sensors 102, 102a, 102b as shown in FIGS. 7-9) of the mobile robot when it is determined that the area is already mapped. That is, operation 18 may determine whether there are other humans, animals, or the like in the area to be disinfected before performing a disinfection operation. If one or more persons, animals, or the like are detected, the mobile robot may output a notification (e.g., to leave the area) via the user interface 110 (e.g., display a notification on a display screen, output an audio notification via a speaker, or the like). In some implementations, a notification message may be transmitted to the server 140 and/or remote platform 160 via the communications network 130 that humans and/or animals have been detected as being present in the area. Disinfection of the area may be postponed by the mobile robot, one or more instructions received by the user interface 110, and/or from the server 140 and/or remote platform 160.

At operation 20, a light source (e.g., light source 104 shown in FIGS. 7-9 and described in detail below) of the mobile robot may emit ultraviolet (UV) light to disinfect at least a portion of the area. The UV light may disinfect air, a surface, and/or an object. In some implementations of emitting light, the mobile robot may be operated in a first mode to disinfect the area, and/or a second mode to disinfect at least one predetermined portion of the area.

Figure 10:
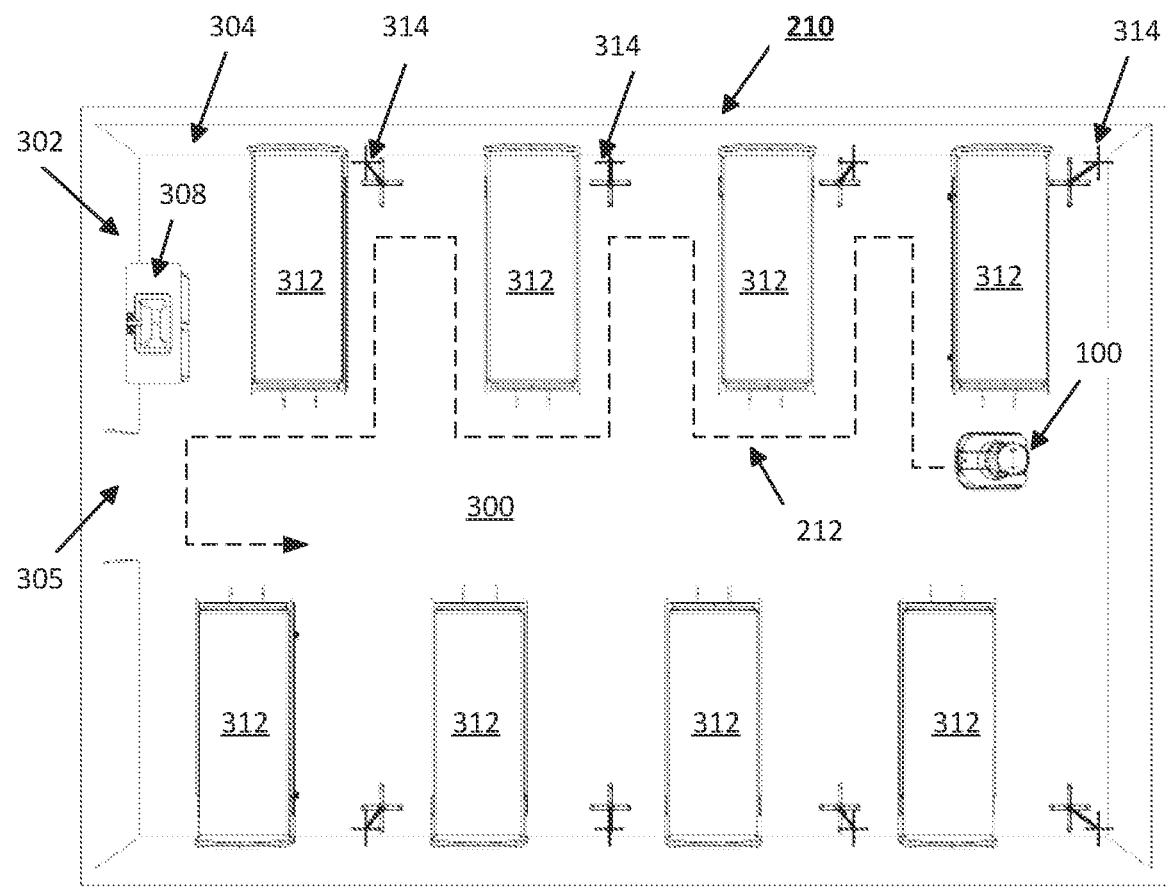
FIG. 10 shows an example of a path of the actuated mobile robot to apply a dosage of UV light in an area according to an implementation of the disclosed subject matter.
Figure 11:
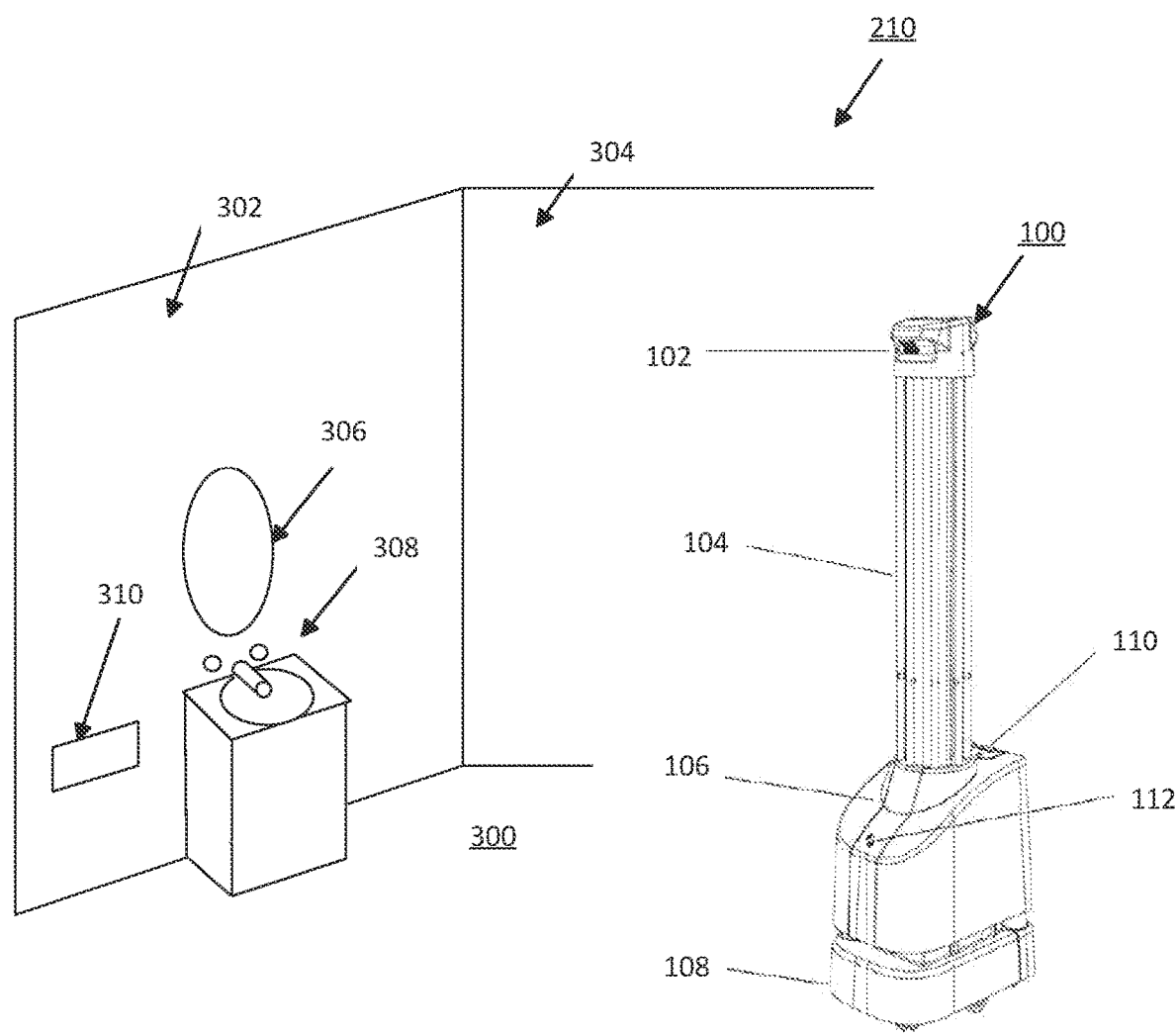
FIG. 11 shows an example of the mobile robot outputting UV light onto surfaces, objects, hotspots, and/or reference tags of an area to disinfect them according to an implementation of the disclosed subject matter.

At operation 22, the processor of the mobile robot may control a drive system (e.g., drive system 108 shown in FIG. 6 and described in detail below) of the mobile robot to move within the area (e.g., room 210 shown in FIG. 10) to detect other surface and objects in the area using the one or more sensors. For example, the mobile robot 100 may be moved along path 212 to detect walls (e.g., surfaces 302, 304), a floor (e.g., surface 300), object 306 (e.g., a mirror), object 308 (e.g., a sink), reference tag 310, object 312 (e.g., a bed), object 314 (e.g., 4-hook IV stand), and the like, as shown in FIGS. 10-11. The objects and/or surfaces may be detected by sensors 102, 102a, 102b as shown in FIGS. 7-9. The reference tag 310 may have a first state and may change to a second state when a dosage of UV light is applied to the reference tag 310. In some implementations, the reference tag 310 may be a virtual reference tag that is represented in a 2D or 3D map of the area, which may change states when UV light is applied to the area that corresponds with the mapped area.

At operation 24 shown in FIG. 1B, the processor (e.g., controller 114 shown in FIG. 12) of the mobile robot may generate a two-dimensional (2D) map or a three-dimensional (3D) map. The 2D and/or 3D map may be based on the surfaces and/or objects detected using the sensors as the mobile robot moves. The 2D and/or 3D map may include an exposure map of at least one of the air, the surface, and the object exposed by the emitted UV light (e.g., from the light source 104 shown in FIGS. 7-9 and described in detail below) and as the mobile robot moves.

At operation 26, a memory (e.g., memory 118 and/or fixed storage 120 shown in FIG. 12) communicatively coupled to the processor of the mobile robot may store a trajectory of the mobile robot moving within the area, the generated map, and/or the generated exposure map. That is, the memory may store the trajectory of the mobile robot, the generated map that includes the detected surfaces of the area, and the exposure map that details the exposure of the area to UV light. In some implementations, the server 140, database 150, and/or remote platform 160 may store at least a portion of the trajectory of the mobile robot moving within the area, the generated map, and/or the generated exposure map, which may be retrieved by the mobile robot via the network interface 116 and the communications network 130.

Figure 12:
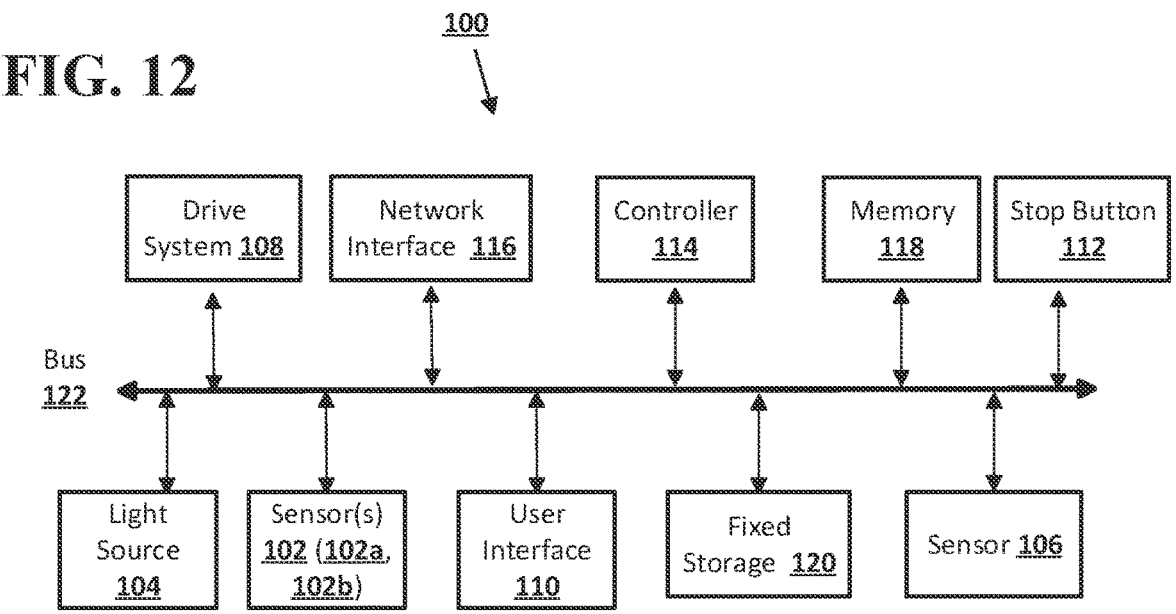
FIG. 12 shows an example configuration of the mobile robot of FIGS. 6-8 according to an implementation of the disclosed subject matter.

At operation 28, a disinfection report based on the generated exposure map may be output by the mobile robot via the user interface (e.g., user interface 110 shown in FIG. 12) and/or the communications interface (e.g., network interface 116 shown in FIG. 12). For example, a display screen of the user interface may display the disinfection report, which may show the portions of the area that have been disinfected, and the intensity of the disinfection (e.g., a LOG value). In some implementations, the mobile robot may transmit the disinfection report via the network interface 116 and the communications network 130 to the server 140, the database 150, and/or the remote platform 160, which may store the disinfection report. A user device that may be coupled to the communications network may retrieve the disinfection report from the server 140, database 150, and/or remote platform 160.

FIG. 2 shows that controlling the drive system at operation 22 in FIG. 1A may include additional operations according to an implementation of the disclosed subject matter. At operation 32, the processor (e.g., controller 114 shown in FIG. 12) and at least one output signal from the one or more sensors (e.g., sensors 102, 102*a*, 102*b* as shown in FIGS. 7-9) may be used to determine disinfection positions for the mobile robot to output the UV light to disinfect the air, the surface, and/or the object in the area based on the received command. For example, the sensors may determine disinfection positions such as walls (e.g., surfaces 302, 304), a floor (e.g., surface 300), object 306 (e.g., a mirror), object 308 (e.g., a sink), reference tag 310, object 312 (e.g., a bed), object 314 (e.g., 4-hook IV stand), and the like, as shown in FIGS. 10-11. At operation 34, the processor of the mobile robot may adjust a speed of movement of the drive system (e.g., drive system 108 shown in FIG. 7) of the mobile robot and/or a duration time for outputting the UV light to one or more of the disinfection positions based on the one or more pathogens and/or microorganisms to be targeted, and/or the LOG level of the received command. That is, the speed of movement, the duration time, and/or the LOG level may be adjusted to perform a disinfection operation at the determined disinfection positions.

Figure 3B:
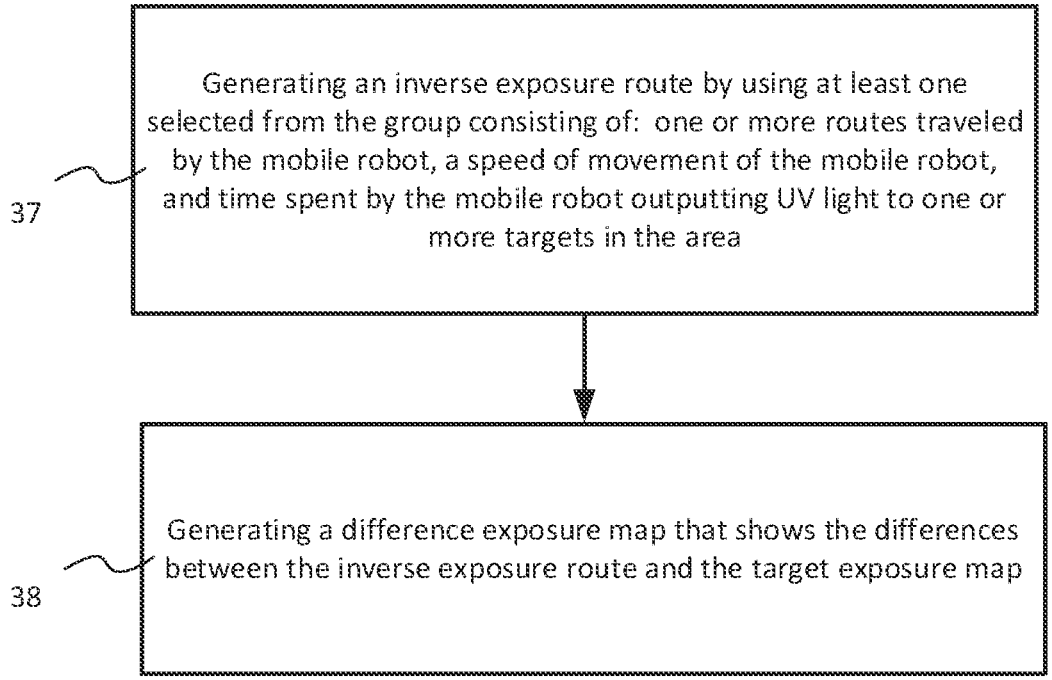

FIGS. 3A-3B show optional operations of method 10 of FIGS. 1A-1B according to an implementation of the disclosed subject matter. At operation 36, the processor (e.g., controller 114 shown in FIG. 12) of the mobile robot may stop the output of UV light from the light source (e.g., light source 104 shown in FIGS. 7-9) when UV light has been output to the area based on the generated exposure map.

From a target exposure map, an operator (e.g., at server 140 and/or remote platform 160 shown in FIG. 13) and/or the processor of the mobile robot may determine an optimal disinfection route that may be based on a pathway of the mobile robot, a speed of movement, and/or a time sequence to obtain the target exposure map, as a result of an inverse exposure routing operation as shown in operation 37 shown in FIG. 3B. For example, the inverse exposure route may be generated by the processor using the target exposure map and iteratively one or more simulations of the mobile robot route, outputting UV light to one or more targets in the area until the simulated exposure map is equal to the target exposure map with a predetermined limit.

As shown in operation 38 of FIG. 3B, the processor may generate a difference exposure map based on the inverse exposure route and the target exposure map. The generated difference exposure map may show the performance of a disinfection routine performed by the mobile robot. The processor of the mobile robot may use the generated difference exposure map to determine whether there are any remaining portions, areas, and/or surfaces to be disinfected by UV light. When the processor determines that there are no remaining portions or that the remaining portions are within predefined limits, the processor may stop the output of UV light from the light source.

The stopping of the output of the UV light may occur when the difference exposure map shows that there are no portions of the area to be exposed further by the UV light. That is, the generated difference exposure map may be used by the mobile robot to determine areas that have not been disinfected, and perform disinfection operations by outputting UV light to the determined areas until the difference exposure map shows that the areas have been disinfected.

Figure 4:
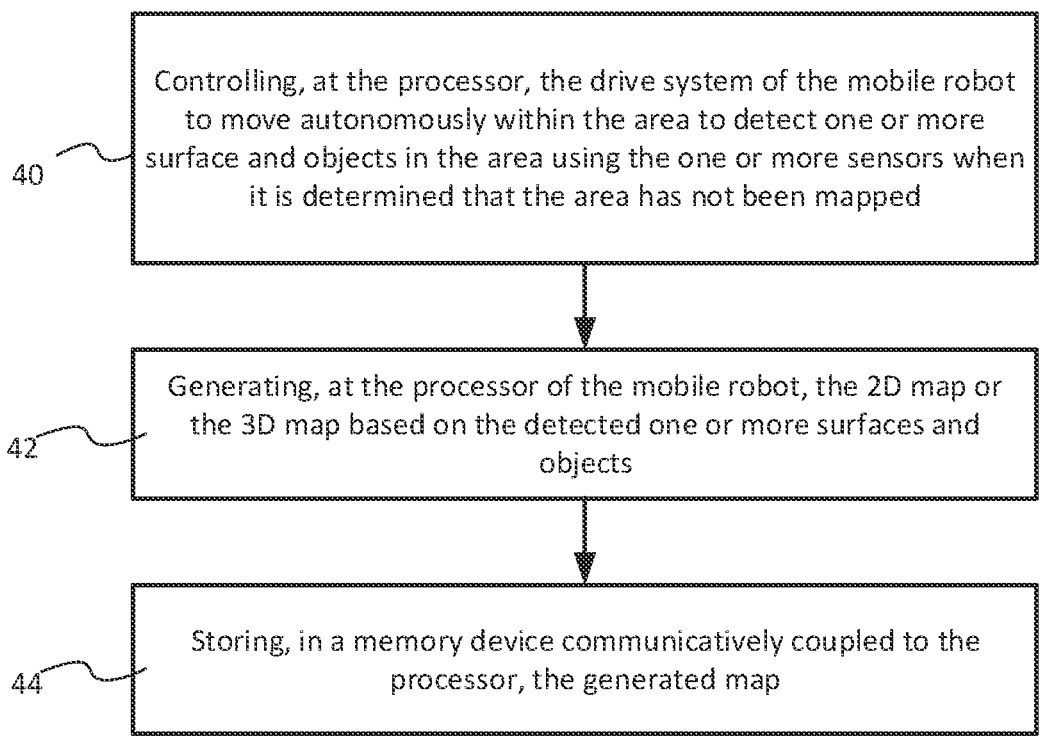

FIG. 4 shows optional operations of method 10 of FIGS. 1A-1B according to an implementation of the disclosed subject matter. At operation 40, the processor (e.g., controller 114 shown in FIG. 12) of the mobile robot may control the drive system (e.g., drive system 108 shown in FIG. 7) to move autonomously within the area to detect one or more surface and objects in the area using the one or more sensors (e.g., sensors 102, 102*a*, 102*b* as shown in FIGS. 7-9) when it is determined that the area has not been mapped. For example, the sensors may be used to detect For example, the mobile robot 100 may be moved along path 212 to detect walls (e.g., surfaces 302, 304), a floor (e.g., surface 300), object 306 (e.g., a mirror), object 308 (e.g., a sink), reference tag 310, object 312 (e.g., a bed), object 314 (e.g., 4-hook IV stand), and the like, as shown in FIGS. 10-11. At operation 42, the processor of the mobile robot may generate the 2D map and/or the 3D map based on the detected one or more surfaces and objects. At operation 44, the generated map may be stored in a memory device (e.g., memory 118 and/or fixed storage 120 shown in FIG. 12) communicatively coupled to the processor. In some implementations, the generated 2D and/or 3D map may be transmitted using the network interface 116 via communications network 130 to server 140, database 150, and/or remote platform 160 for storage.

Figure 5A:
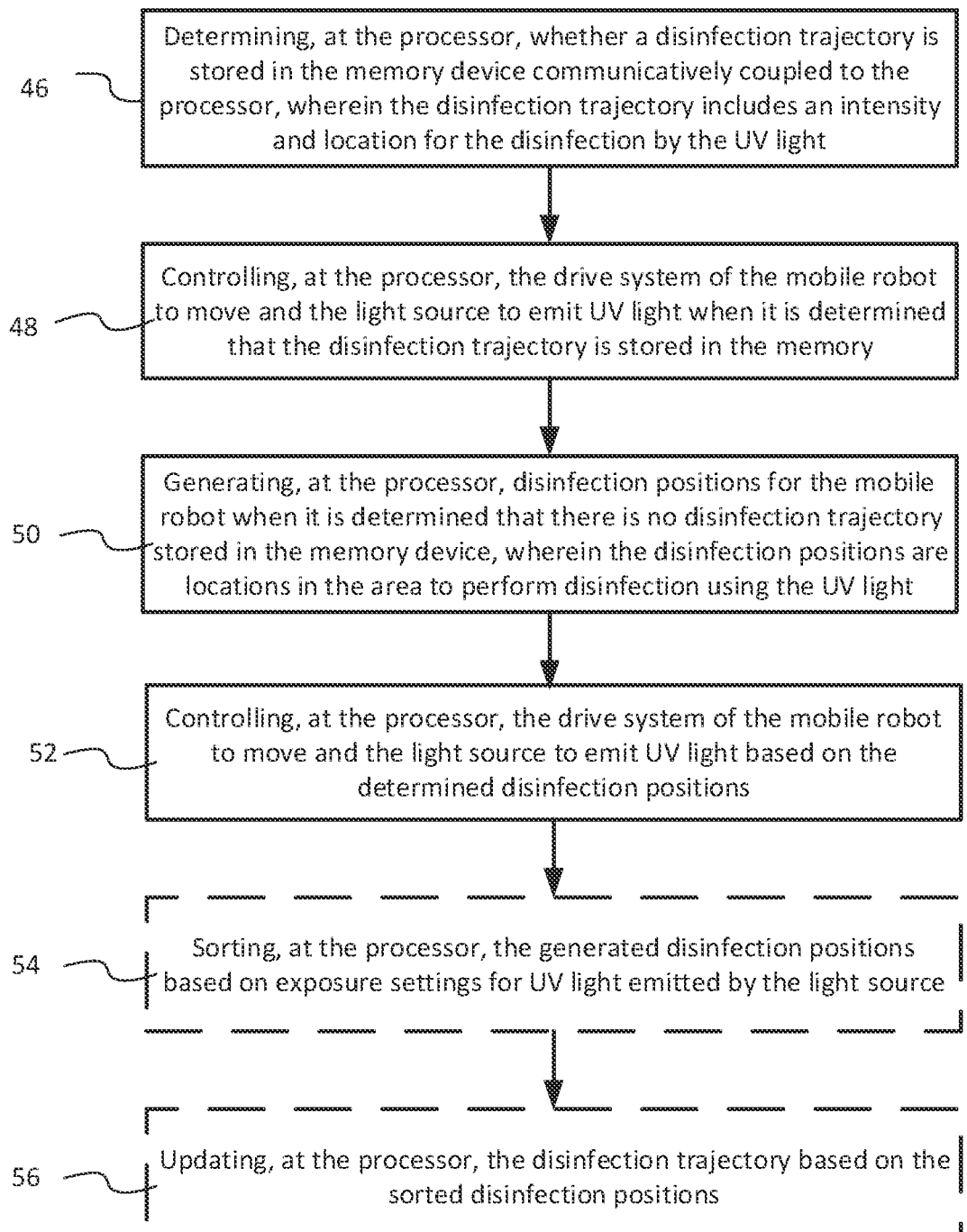
Figure 5B:
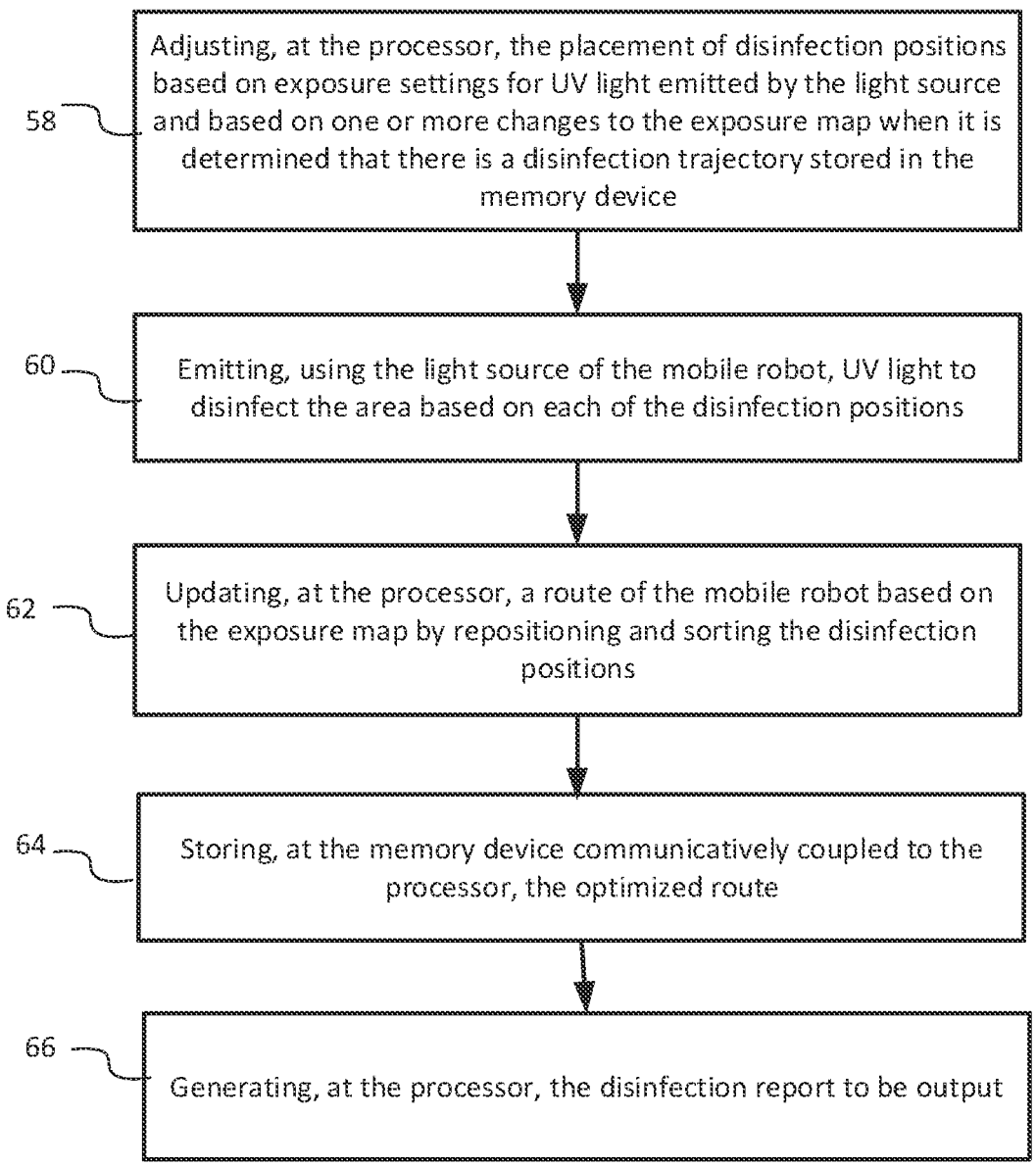

FIGS. 5A-5B show optional operations of method 10 of FIGS. 1A-1B according to an implementation of the disclosed subject matter. At operation 46 of FIG. 5A, the emitting the UV light (e.g., at operation 20 shown in FIG. 1A) may include determining, at the processor (e.g., controller 114 shown in FIG. 12) of the mobile robot, whether a disinfection trajectory is stored in the memory device (e.g., memory 118 and/or fixed storage 120 shown in FIG. 12) communicatively coupled to the processor. In some implementations, the processor may determine whether the disinfection trajectory may be stored in the server 140, database 150, and/or remote platform 160 using network interface 116. The disinfection trajectory may include an intensity and location for the disinfection by the UV light. At operation 48, the processor may control the drive system (e.g., drive system 108 shown in FIG. 7) of the mobile robot to move and the light source to emit UV light when it is determined that the disinfection trajectory is stored in the memory and/or at the server 140, database 150, and/or remote platform 160.

At operation 50 as shown in FIG. 5A, the processor may generate disinfection positions for the mobile robot when it is determined that there is no disinfection trajectory stored in the memory device and/or at the server 140, database 150, and/or remote platform 160. The disinfection positions may be locations in the area to perform disinfection using the UV light. At operation 52, the processor may control the drive system of the mobile robot to move the mobile robot, and may control the light source (e.g., light source 104 shown in FIG. 7-9) to emit UV light based on the determined disinfection positions.

Operations 54 and 56 shown in FIG. 5A may be optional operations performed according to an implementation of the disclosed subject matter. At operation 54, the processor may sort the generated disinfection positions (e.g., the disinfection positions generated at operation 50) based on exposure settings for UV light emitted by the light source (e.g., light source 104 shown in FIG. 7-9). At operation 56, the processor may update the disinfection trajectory based on the sorted disinfection positions.

The operations shown in FIG. 5B are optional operations of method 10 that may be performed, for example, after operation 52 shown in FIG. 5A according to an implementation of the disclosed subject matter. At operation 58, the processor (e.g., controller 114 shown in FIG. 12) of the mobile robot may adjust the placement of disinfection positions. The adjustment may be based on exposure settings for UV light emitted by the light source (e.g., light source 104 shown in FIGS. 7-9) and/or based on one or more changes to the exposure map when it is determined that there is a disinfection trajectory stored in the memory device (e.g., at operation 46 shown in FIG. 5A). At operation 60, the light source of the mobile robot may emit UV light to disinfect the area (e.g., room 210 shown in FIG. 10) based on each of the disinfection positions.

At operation 62 shown in FIG. 5B, the processor may update a route of the mobile robot based on the exposure map by repositioning and/or sorting the disinfection positions. For example, the order that the disinfection positions are disinfected by UV light may be adjusted by the processor. That is, the route that the mobile robot takes to disinfect each of the positions may change.

At operation 64, the memory device (e.g., memory 118 and/or fixed storage 120 shown in FIG. 12) of the mobile robot communicatively coupled to the processor may store the optimized route. In some implementations, at least a portion of the optimized route may be stored server 140, database 150, and/or remote platform 160. At operation 66, the processor may generate the disinfection report to be output (e.g., at operation 28 shown in FIG. 1B and described above).

Figure 6:
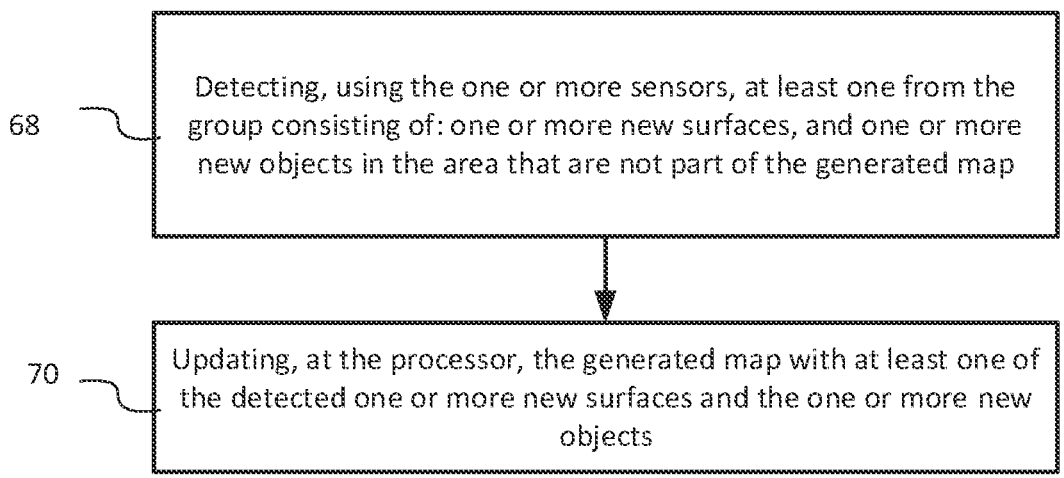

FIG. 6 shows optional operations of method 10 of FIGS. 1A-1B according to an implementation of the disclosed subject matter. At operation 68, the one or more sensors of the mobile robot may detect one or more new surfaces, and/or one or more new objects in the area that are not part of the generated map. For example, the sensors may detect walls (e.g., surfaces 302, 304), a floor (e.g., surface 300), object 306 (e.g., a mirror), object 308 (e.g., a sink), reference tag 310, object 312 (e.g., a bed), object 314 (e.g., 4-hook IV stand), and the like, as shown in FIGS. 10-11. At operation 70, the processor may update the generated map with at least one of the detected one or more new surfaces and one or more new objects. Disinfection of the detected surfaces and/or objects using UV light may be planned and/or performed based on the updated map.

FIGS. 7-9 show a plurality of external views of the mobile robot 100 that includes sensors to detect surfaces and objects in an area, and a light source to output UV light having a first dosage based on a received dosage level to disinfect the air, objects, and/or surfaces in the area according to implementations of the disclosed subject matter. The mobile robot 100 may include at least a first sensor 102 (shown as sensor 102*a* and 102*b* in FIG. 8), a light source 104 to output ultraviolet light, at least a second sensor 106, a drive system 108, a user interface 110, and/or a stop button 112. A controller (e.g., controller 114 shown in FIG. 12 and described below) may be communicatively coupled to the at least one first sensor 102, the light source 104, the at least one second sensor 106, the drive system 108, the user interface 110 and the stop button 112, may control the operations of the mobile robot 100.

The at least one first sensor 102 (including sensors 102*a*, 102*b* shown in FIG. 8) may determine at least one of an orientation of the mobile robot 100 (e.g., a direction that a front side and/or a first side of a robot is facing), a location of the mobile robot 100 (e.g., a location of the mobile robot 100 in an area), and/or when the light source 104 is within a predetermined distance of a surface and/or object in the area (e.g., surface 300, 302, and/or 304, and/or object 306, 308 shown in FIG. 11). In some implementations, the first sensor 102 may detect air, a surface, a reference tag, and/or objects that may be disinfected with UV light from the light source 104.

In some implementations, the at least one first sensor 102 may have a field of view of degrees diagonally. The at least one sensor 102 may have a detection distance of 0.2-4 meters. As shown in FIGS. 7-9, the at least one first sensor 102 may be disposed over the light source 104.

The at least one first sensor 102 may include a first side sensor disposed on a first side of the mobile robot 100 and a second side sensor that may be disposed on a second side of the device. For example, as shown in FIG. 8, sensor 102*a* may be disposed on a first side (e.g., a front side) of the mobile robot 100, and sensor 102*b* may be disposed on a second side (e.g., a back side) of the mobile robot 100. Although sensors on two sides of the robot are shown in FIG. 8, there may be a plurality of sensors disposed on different sides of the mobile robot 102 to at least detect surfaces and/or objects. In some implementations, sensor 102*a* and/or sensor 102*b* may be disposed over the light source 104.

The light source 104 may be one or more bulbs, one or more lamps, and/or an array of light emitting diodes (LEDs) or organic light emitting diodes (OLEDs) to emit UV light (e.g., light having a wavelength of 10 nm-400 nm). The dosage of the UV light (e.g., intensity, duration, optical power output, or the like) may be controlled by the controller 114, which may also turn on or off a portion or all of the devices (e.g., bulbs, lamps, LEDs, OLEDs) of the light source 104. The light source may be controlled to emit UV light when the mobile robot is within an area, as the mobile robot moves within the area, before the mapping of the area, during the mapping of the area, and/or after the mapping of the area.

In some implementations, the mobile robot may include a secondary light source, such as light source 126 which may be coupled to a robotic arm 124 of the mobile robot 100. The light source 126 may emit UV light from one or more bulbs, one or more lamps, and/or an array of light emitting diodes (LEDs) or organic light emitting diodes (OLEDs) to emit UV light (e.g., light having a wavelength of 10 nm-400 nm). The light source 126 may be controlled to emit UV light. In some implementations, the light source 126 may be used to provide a dosage of UV light to air, objects, surfaces, reference tags, or the like that the light source 104 may not have provided a dosage of UV light for. Movement of the arm 124 may be controlled by the controller 114 shown in FIG. 12.

The at least one second sensor 106 may be communicatively coupled to the controller 114 shown in FIG. 12, and may be used to detect air, surfaces, and/or objects that may be mapped and/or disinfected with UV light from the light source 104. In some implementations, the at least one second sensor 106 may determine at least one of an orientation of the mobile robot 100 (e.g., a direction that a front side and/or a first side of a robot is facing), a location of the mobile robot 100 (e.g., a location of the mobile robot 100 in an area), and/or when the light source 104 is within a predetermined distance of a surface and/or object in the area (e.g., surface 300, 302, and/or 304, and/or object 306, 308 shown in FIG. 11).

In some implementations, the sensor 102, 106 may be used to detect a human and/or an animal that may be in the area. The controller 114 may prevent the light source 104 from operating when a human and/or animal is detected by the sensor.

In some implementations, the sensor 102, 106 may be a time-of-flight sensor, an ultrasonic sensor, a two-dimensional (2D) Light Detection and Ranging (LiDAR) sensor, a three-dimensional (3D) LiDAR sensor, and/or a radar (radio detection and ranging) sensor, a stereo vision sensor, 3D three camera, a structured light camera, or the like. The sensor 106 may have a field of view of 20-27 degrees. In some implementations, the sensor 106 may have a detection distance of 0.05-4 meters.

The mobile robot 100 may include a motor to drive the drive system 108 to move the mobile robot in an area, such as a room, a building, or the like. The drive system 108 may include wheels, which may be adjustable so that the drive system 108 may control the direction of the mobile robot 100.

In some implementations, the mobile robot 100 may include a base with the drive system 108, and the sensor 102, 106 may be disposed on the base.

The controller 114 may control and/or operate the mobile robot 100 in an operation mode which may be a manual mode, an autonomous mode, and/or a tele-operation mode. In the manual mode, the controller 114 may receive one or more control signals from the user interface 110 and/or the stop button 112. For example, a user may control the movement, direction, and/or stop the motion of the mobile robot 100 by making one or more selections on the user interface 110. The stop button 112 may be an emergency stop (ESTOP) button which may stop all operations and/or movement of the mobile robot 100 when selected. In some implementations, the controller 114 may receive at least one control signal via a network interface 116 (shown in FIG. 12) when operating in the tele-operation mode. For example, the network interface may receive control signals via network 130 from server 140, database 150, and/or remote platform 160, as described below in connection with FIG. 13.

In some implementations, when the mobile robot 100 is moving in a direction, the sensor 102, 106 may detect a geometry of one or more surfaces (e.g., surfaces 300, 302, 304 shown in FIG. 11), objects (e.g., objects 306, 308 shown in FIG. 11), and/or reference tags (e.g., reference tag 310 shown in FIG. 9). The output of the at least one first sensor 102 may be, for example, a point cloud of the one or more objects in the path of the mobile robot 100. When the sensor 102 and/or sensor 106 is a stereo vision sensor, images from two sensors (i.e., where the two sensors may be part of the stereo vision sensor of the sensor 102 and/or sensor 106) within a known distance from one another distance may be captured at a predetermined point in time, and/or at predetermined time intervals with a global shutter. The global shutter may be configured so that the two sensors of the stereo vision sensor may capture images about simultaneously. One or more features (e.g., surfaces 300, 302, 304, and/or objects 306, 308, and/or reference tag 310 shown in FIG. 10) may be determined from the captured images, and be compared to one another to determine portions that are matching. As the focal length of the two sensors of the stereo vision sensor and the distance between the two sensors (e.g., about 6 cm) may be stored in memory 118 and/or fixed storage 120 (shown in FIG. 11), the controller 114 and/or the at least one first sensor 102 may use the captured images and the stored values to determine the distance from the sensor 102, 106 to the surfaces and/or objects, and may be used by the processor for outputting a dosage of UV light from the light source. In some implementations, the sensor 102, 106 may include at least one laser, LED, and/or OLED, to radiate one or more points on surfaces of objects, when the objects may be without identifying features (e.g., blank walls).

When detecting the surface and/or object, the sensor 102, 106 may be a time-of-flight (TOF) sensor. At least one photon of light may be output by the sensor 102, 106, and may be transmitted through the air. When the at least one photon of light radiates a surface and/or an object, a portion of the light may be reflected by the surface and/or the object may return to a receiver portion of the sensor 102, 106. The sensor 106 may calculate the time between sending the at least one photon of light and receiving the reflection, and may multiply this value by the speed of light in air, to determine the distance between the sensor 102, 106 and surface and/or object. This may be used to generate the map of the area that the mobile robot is operating within.

FIG. 12 shows example components of the mobile robot 100 suitable for providing the implementations of the disclosed subject matter. The mobile robot 100 may include a bus 122 which interconnects major components of the mobile robot 100, such as the drive system 108, a network interface 116 operable to communicate with one or more remote devices via a suitable network connection, the controller 114, a memory 118 such as Random Access Memory (RAM), Read Only Memory (ROM), flash RAM, or the like, the stop button 112, the light source 104, the at least one first sensor 102, a user interface 110 that may include one or more controllers and associated user input devices such as a keyboard, touch screen, and the like, a fixed storage 120 such as a hard drive, flash storage, and the like, and the at least one second sensor 106.

The bus 122 allows data communication between the controller 114 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the mobile robot 100 are generally stored on and accessed via a computer readable medium (e.g., fixed storage 120), such as a solid-state drive, hard disk drive, an optical drive, solid state drive, or other storage medium.

The network interface 116 may provide a direct connection to a remote server (e.g., server 140, database 150, and/or remote platform 160 shown in FIG. 12) via a wired or wireless connection (e.g., network 130 shown in FIG. 12). The network interface 116 may provide such connection using any suitable technique and protocol as will be readily understood by one of skill in the art, including digital cellular telephone, WiFi, Bluetooth®, near-field, and the like. For example, the network interface 116 may allow the mobile robot 100 to communicate with other computers via one or more local, wide-area, or other communication networks, as described in further detail below. The mobile robot may transmit data via the network interface to the remote server that may include a path of operation, the surfaces and/or areas radiated with UV light, and the like.

Many other devices or components (not shown) may be connected in a similar manner. Conversely, all of the components shown in FIG. 12 need not be present to practice the present disclosure. The components can be interconnected in different ways from that shown. Code to implement the present disclosure can be stored in computer-readable storage media such as one or more of the memory 118, fixed storage 120, or on a remote storage location.

Figure 13:
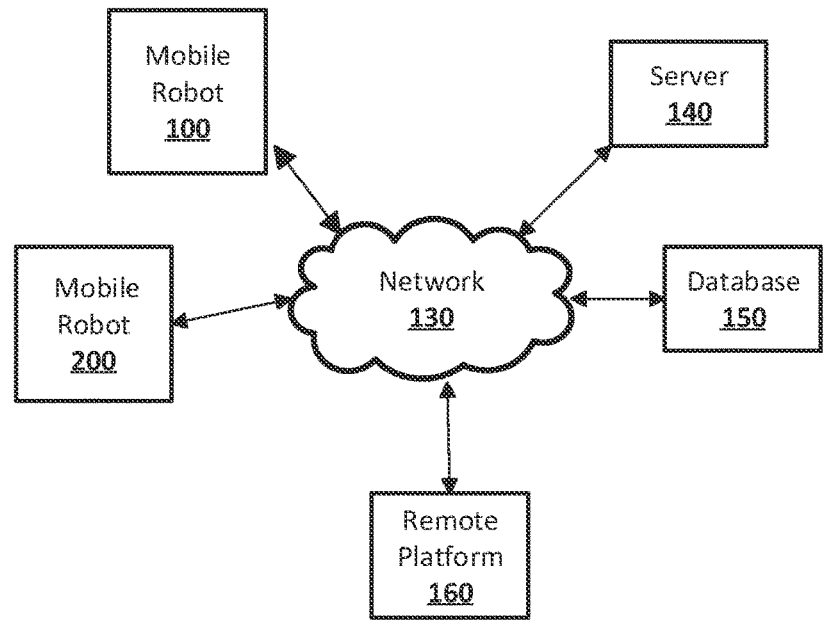
FIG. 13 shows a network configuration which may include a plurality of mobile robots according to implementations of the disclosed subject matter.

FIG. 13 shows an example network arrangement according to an implementation of the disclosed subject matter. Mobile robot 100 described above, and/or a similar mobile robot 200 may connect to other devices via network 130. The network 130 may be a local network, wide-area network, the Internet, or any other suitable communication network or networks, and may be implemented on any suitable platform including wired and/or wireless networks. The mobile robot 100 and/or mobile robot 200 may communicate with one another, and/or may communicate with one or more remote devices, such as server 140, database 150, and/or remote platform 160. The remote devices may be directly accessible by the mobile robot 100, 200 or one or more other devices may provide intermediary access such as where a server 140 provides access to resources stored in a database 150. The mobile robot 100, 200 may access remote platform 160 or services provided by remote platform 160 such as cloud computing arrangements and services. The remote platform 160 may include one or more servers 140 and/or databases 150.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as solid state drives, DVDs, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may include using hardware that has a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   positioning a mobile robot in an area to be disinfected;
   receiving, at a user interface or communications interface of the mobile robot, a command to perform disinfection;
   determining, at a processor of the mobile robot, whether the area is already mapped by at least one from the group consisting of: by determining whether a map of the area is located in a memory device communicatively coupled to the processor; by determining whether the map of the area is available from a server via the communications interface; and by detecting one or more points in the area using one or more sensors, and determining whether the detected points are included in the map stored in the memory or are accessible from the server;
   determining, at the processor of the mobile robot, whether the area is cleared for disinfection based on one or more signals outputted from the one or more sensors of the mobile robot when it is determined that the area is already mapped;
   emitting, using a light source of the mobile robot, ultraviolet (UV) light to disinfect at least a portion of the area, including at least one selected from the group consisting of: air, a surface, and an object;
   controlling, at the processor, a drive system of the mobile robot to move within the area to detect other surface and objects in the area using the one or more sensors;
   generating, at the processor of the mobile robot, a two dimensional (2D) map or a three dimensional (3D) map based on the detected at least one of the surface and the object as the mobile robot moves, and an exposure map of at least one of the air, the surface, and the object exposed by the emitted UV light in the area to be disinfected and dosage levels of the emitted UV light applied as the mobile robot moves;

storing, at the memory communicatively coupled to the processor, a trajectory of the mobile robot moving within the area, the generated map, and the generated exposure map; and outputting, via the user interface or the communications interface, a disinfection report based on the generated exposure map.

2. The method of claim 1, wherein the received command to perform disinfection includes at least one selected from the group consisting of: one or more pathogens or microorganisms to be targeted by the mobile robot for disinfection; and a LOG level that defines a dose of the UV light.

3. The method of claim 1, wherein the controlling the drive system further comprises:

determining, using the processor and at least one output signal from the one or more sensors, disinfection positions for the mobile robot to output the UV light to disinfect at least one of the air, the surface, and the object in the area based on the received command.

4. The method of claim 3, further comprising:

adjusting, at the processor, a speed of movement of the drive system of the mobile robot and a duration time for outputting the UV light to one or more of the disinfection positions based on at least one of the group consisting of: the one or more pathogens or microorganisms to be targeted; and the LOG level of the received command.

5. The method of claim 1, further comprising:

stopping, at the processor, the output of UV light from the light source, when UV light has been output to the area based on the generated exposure map.

6. The method of claim 5, wherein the stopping further comprises:

generating an inverse exposure route by using at least one selected from the group consisting of: one or more routes traveled by the mobile robot, a speed of movement of the mobile robot, and time spent by the mobile robot outputting UV light to one or more targets in the area; and generating a difference exposure map that shows the differences between the generated exposure map and the generated inverse exposure route, wherein the stopping of the output of the UV light occurs when the difference map shows that there are no portions of the area to be exposed further by the UV light.

7. The method of claim 1, further comprising:

controlling, at the processor, the drive system of the mobile robot to move autonomously within the area to detect one or more surface and objects in the area using the one or more sensors when it is determined that the area has not been mapped; and generating, at the processor of the mobile robot, the 2D map or the 3D map based on the detected one or more surfaces and objects; and storing, in a memory device communicatively coupled to the processor, the generated map.

8. The method of claim 1, wherein the emitting the UV light further comprises:

determining, at the processor, whether a disinfection trajectory is stored in the memory device communicatively coupled to the processor, wherein the disinfection trajectory includes an intensity and location for the disinfection by the UV light; and controlling, at the processor, the drive system of the mobile robot to move and the light source to emit UV light when it is determined that the disinfection trajectory is stored in the memory.

9. The method of claim 8, further comprising:

generating, at the processor, disinfection positions for the mobile robot when it is determined that there is no disinfection trajectory stored in the memory device, wherein the disinfection positions are locations in the area to perform disinfection using the UV light; and controlling, at the processor, the drive system of the mobile robot to move and the light source to emit UV light based on the determined disinfection positions.

10. The method of claim 9, further comprising:

sorting, at the processor, the generated disinfection positions based on exposure settings for UV light emitted by the light source; and updating, at the processor, the disinfection trajectory based on the sorted disinfection positions.

11. The method of claim 8, further comprising:

adjusting, at the processor, the placement of disinfection positions based on exposure settings for UV light emitted by the light source and based on one or more changes to the exposure map when it is determined that there is a disinfection trajectory stored in the memory device.

12. The method of claim 11, further comprising:

emitting, using the light source of the mobile robot, UV light to disinfect the area based on each of the disinfection positions.

13. The method of claim 12, further comprising:

updating, at the processor, a route of the mobile robot based on the exposure map by repositioning and sorting the disinfection positions.

14. The method of claim 13, further comprising:

storing, at the memory device communicatively coupled to the processor, the optimized route; and generating, at the processor, the disinfection report to be output.

15. The method of claim 1, wherein the emitting the UV light to disinfect at least a portion of the area comprises operating the mobile robot in at least one selected from the group consisting of: a first mode to disinfect the area; and a second mode to disinfect at least one predetermined portion of the area.

16. The method of claim 1, wherein the received command at a user interface or communications interface of the mobile robot is a single instruction to perform all operations for disinfection of the area without receiving additional commands.

17. The method of claim 1, further comprising:

detecting, using the one or more sensors, at least one from the group consisting of: one or more new surfaces, and one or more new objects in the area that are not part of the generated map; and updating, at the processor, the generated map with at least one of the detected one or more new surfaces and the one or more new objects.

* * * * *